(12) United States Patent
Fischer et al.

(10) Patent No.: US 9,545,779 B2
(45) Date of Patent: Jan. 17, 2017

(54) DEVICE FOR PRODUCING A WEB OF CORRUGATED CARDBOARD THAT IS LAMINATED ON AT LEAST ONE SIDE

(71) Applicant: BHS Corrugated Maschinen-und Anlagenbau GmbH, Weiherhammer (DE)

(72) Inventors: Markus Fischer, Mantel (DE); Florian Müller, Weiherhammer (DE)

(73) Assignee: BHS Corrugated Maschinen-und Anlagenbau GmbH, Weiherhammer (DE)

( * ) Notice: Subject to any disclaimer, the term of this patent is extended or adjusted under 35 U.S.C. 154(b) by 215 days.

(21) Appl. No.: 14/466,123

(22) Filed: Aug. 22, 2014

(65) Prior Publication Data

US 2015/0053330 A1 Feb. 26, 2015

(30) Foreign Application Priority Data

Aug. 23, 2013 (DE) ........................ 10 2013 216 828

(51) Int. Cl.
*B31F 1/28* (2006.01)
*B29C 53/28* (2006.01)
(Continued)

(52) U.S. Cl.
CPC ......... *B32B 37/0053* (2013.01); *B05C 1/0878* (2013.01); *B05C 1/0882* (2013.01);
(Continued)

(58) Field of Classification Search
CPC .... B05C 1/0878; B05C 1/0882; B31F 1/2818; B31F 1/2831; B31F 1/2877; B29C 53/28; B29C 53/285; B29C 66/9221; B29C 66/92211; B29C 66/9231; B29C 66/92311; B29C 66/9241; B29C 66/92431; B29C 66/92611; B29C 66/92613; B32B 37/0053; B32B 37/0076; B32B 37/10; B32B 37/12; B32B 37/20; Y10T 156/1016; Y10T 156/1025; Y10T 156/1798

See application file for complete search history.

(56) References Cited

U.S. PATENT DOCUMENTS 4,319,947 A * 3/1982 Tokuno ................. B31F 1/2831
156/351
5,344,520 A * 9/1994 Seki ..................... B31F 1/2877
100/153
(Continued)

FOREIGN PATENT DOCUMENTS

DE 39 28 386 C1 9/1990
DE 42 41 743 A1 6/1994
(Continued)

*Primary Examiner* — Michael Tolin
(74) *Attorney, Agent, or Firm* — McGlew and Tuttle, P.C.

(57) ABSTRACT

The invention relates to a device for producing a web of corrugated cardboard comprising a first corrugating roller for producing a corrugated web. The device further has a glue application roller for applying glue to the corrugated web. The glue application roller is associated to the first corrugating roller so as to form a gap and is displaceable relative to the first corrugating roller in order to influence the glue application quantity. The device further comprises a displacement device for displacing the glue application roller relative to the first corrugating roller and a pressing device for pressing a laminating web against the corrugated web. It is further provided with a regulating device which is in signal connection with the displacement device, a gap regulating unit in order to adjust a gap width of the gap between the first corrugating roller and the glue application roller, and a contact force regulating unit in order to adjust a contact force applied to the first corrugating roller by the glue application roller.

16 Claims, 3 Drawing Sheets

(51) Int. Cl.
　　*B32B 37/20*　　(2006.01)
　　*B32B 37/00*　　(2006.01)
　　*B05C 1/08*　　(2006.01)
　　*B29C 65/00*　　(2006.01)
　　*B32B 37/10*　　(2006.01)
　　*B32B 37/12*　　(2006.01)

(52) U.S. Cl.
　　CPC ........ *B29C 53/285* (2013.01); *B29C 66/9241* (2013.01); *B29C 66/92611* (2013.01); *B31F 1/2818* (2013.01); *B31F 1/2831* (2013.01); *B31F 1/2877* (2013.01); *B32B 37/0076* (2013.01); *B32B 37/10* (2013.01); *B32B 37/12* (2013.01); *B32B 37/20* (2013.01); *B32B 2305/22* (2013.01); *B32B 2309/12* (2013.01); *B32B 2554/00* (2013.01); *Y10T 156/1016* (2015.01); *Y10T 156/1025* (2015.01); *Y10T 156/1798* (2015.01)

(56) References Cited

U.S. PATENT DOCUMENTS

| | | | |
|---|---|---|---|
| 5,348,612 A | * | 9/1994 | Buetikofer ............. B05C 1/083 |
| | | | 118/249 |
| 5,415,720 A | | 5/1995 | Schönhammer et al. |
| 5,876,530 A | * | 3/1999 | Seki ...................... B31F 1/2818 |
| | | | 118/258 |
| 6,409,857 B2 | | 6/2002 | Pallas et al. |
| 6,692,602 B1 | | 2/2004 | Mensing et al. |
| 2005/0194103 A1 | | 9/2005 | Kohler |

FOREIGN PATENT DOCUMENTS

| | | |
|---|---|---|
| DE | 197 15 174 A1 | 10/1998 |
| DE | 100 34 780 A1 | 3/2001 |
| DE | 602 14 133 T2 | 3/2007 |
| GB | 2 058 663 A | 4/1981 |

\* cited by examiner

DEVICE FOR PRODUCING A WEB OF CORRUGATED CARDBOARD THAT IS LAMINATED ON AT LEAST ONE SIDE

CROSS-REFERENCE TO RELATED APPLICATIONS

This application claims the priority of Patent Application No. DE 10 2013 216 828.4 filed on 23 Aug. 2013, pursuant to 35 U.S.C. 119(a)-(d), the content of which is incorporated herein by reference as if fully set forth herein.

FIELD OF THE INVENTION

The invention relates to a device for producing an endless web of corrugated cardboard that is laminated on at least one side. The invention further discusses a corresponding method of producing an endless web of corrugated cardboard that is laminated on at least one side.

BACKGROUND OF THE INVENTION

Devices and methods of the generic type are sufficiently known through prior public use. The application of glue to a corrugated web is usually adjusted manually via a gap between a glue application roller and a corrugating roller associated thereto. Furthermore, the contact force of the glue application roller acting on said corrugating roller is usually adjusted as well. The drawback of this method is that the glue application roller may be damaged or destroyed when no corrugated web is provided, thus causing the glue application roller to be pressed directly against the corrugating roller when no corrugated web is arranged therebetween.

SUMMARY OF THE INVENTION

An object of the invention is therefore to provide a device for producing an endless web of corrugated cardboard which is laminated on at least one side, wherein the glue application roller thereof is adjustable or displaceable in an automated manner. Another object of the invention is to provide a corresponding method of producing an endless web of corrugated cardboard which is laminated on at least one side.

These objects are achieved according to the invention by a device for producing an endless web of corrugated cardboard which is laminated on at least one side, the device comprising a first corrugating roller and a second corrugating roller for producing a corrugated web that is provided with a corrugation; a glue application device which comprises a glue application roller for applying glue to the tips of the corrugation of the corrugated web, wherein the glue application roller is associated to the first corrugating roller so as to form a gap; and has a distance from the first corrugating roller that is changeable in order to influence the glue application quantity applied to the tips of the corrugation of the corrugated web; a displacement device for displacing the glue application roller relative to the first corrugating roller; a pressing device for pressing a laminating web against the tips, provided with glue, of the corrugated web which abuts against the first corrugating roller in a pressing region; and a control device which is in signal connection with the displacement device for actuation thereof; comprises a gap regulating unit for regulating a gap width of the gap between the first corrugating roller and the glue application roller; and a contact force regulating unit for regulating a contact force applied to the first corrugating roller by the glue application roller. These objects are further achieved by a method of producing an endless web of corrugated cardboard which is laminated on at least one side, the method comprising the following steps: producing a corrugated web having a corrugation by means of a first corrugating roller and a second corrugating roller; applying glue to tips of the corrugation of the corrugated web by means of a glue application roller of a glue application device, wherein the glue application roller is associated to the first corrugating roller in such a way as to form a gap; and is displaceable relative to the first corrugating roller in order to influence the glue application quantity to be applied to the tips of the corrugation of the corrugated web; providing a displacement device in order to displace the glue application roller relative to the first corrugating roller; pressing a laminating web against the tips provided with glue of the corrugated web by means of a pressing device, wherein the corrugated web abuts against the first corrugating roller in a pressing region; and performing an regulating using a regulating device which is in signal connection with the displacement device for actuation thereof; comprises a gap regulating unit in order to adjust a gap width of the gap between the first corrugating roller and the glue application roller; and comprises a contact force regulating unit in order to adjust a contact force applied to the first corrugating roller by the glue application roller. The gist of the invention is that the regulating device comprises a gap regulating unit for regulating, in other words adjusting, a gap width of the gap between the first corrugating roller and the glue application roller, and a contact force regulating unit for regulating a contact force of the glue application roller acting on the first corrugating roller. By regulating the gap width of the gap between the first corrugating roller and the glue application roller, the glue application quantity to be applied to the tips of the corrugation is adjustable. The glue application quantity to be applied to the tips of the corrugation is adjustable as well by regulating the contact force of the glue application roller acting on the first corrugating roller.

The gap regulating unit is preferably an electric, more preferably an electronic, gap regulating unit. The contact force regulating unit is ideally an electric, more preferably an electronic contact force regulating unit. It is advantageous if the gap width of the gap between the first corrugating roller and the glue application roller is adjusted in increments of 0.01 mm.

The displacement device is actuated in accordance with the regulating signals of the gap regulating unit and/or the contact force regulating unit, causing the glue application roller to be moved relative to the first corrugating roller. The glue application roller is movable away from the first corrugating roller, causing the gap between the two rollers to increase. The glue application roller is movable towards the first corrugating roller, causing the gap between the two rollers to be reduced. The glue application roller may be pressed against the first corrugating roller or against the corrugated web to which glue is applied, causing the contact force between them to increase. When the glue application roller is moved away, the contact force between them is reduced again.

The glue application roller is preferably driven for rotation.

The first corrugating roller and the second corrugating roller are preferably arranged in pairs in a machine frame where they are mounted for rotation, in other words they are drivable for rotation. Between the corrugating rollers, a material web is passed through which is provided with a corrugation by means of the corrugating rollers.

The displacement device is for instance operated pneumatically or hydraulically. Alternatively, the displacement device comprises a motor, in particular an electric motor, which advantageously forms a linear drive. A lever arrangement may be provided as well.

The pressing device for pressing a laminating web against the corrugated web comprises for instance at least one pressure roller or a pressure belt which is circulated by means of at least two deflection rollers.

The signal connection between the regulating device and the displacement device is configured as a wired or a wireless connection. The signal connection allows regulating signals to be transmitted to the displacement device. The regulating signals are preferably electric regulating signals.

The at least one piston cylinder unit of the displacement device for displacing the glue application roller relative to the first corrugating roller is preferably configured in such a way as to be extendable. When the length of the at least one piston cylinder unit is changed, this causes the glue application roller to be displaced relative to the first corrugating roller.

The at least one piston cylinder unit which comprises a first partial work zone, a second partial work zone, and a displaceable piston which separates the first and second partial work zones from each other as well as a piston rod which is connected to the piston is advantageously provided with a flow connection line between the partial work zones. Said flow connection line is ideally provided with a valve which is inserted therein.

The at least one piston cylinder unit ideally comprises a casing which spatially limits the first partial work zone and the second partial work zone. The piston rod protrudes out of the casing and is ideally provided with a fastening means at its free end. Preferably, the casing of the piston cylinder unit is further provided with another fastening means. Via the fastening means, the at least one piston cylinder unit is directly or indirectly mounted to the machine frame of the device and to the displaceable glue application device. Said glue application device is active between the glue application roller and the first corrugating roller.

If a first pressure measuring unit is provided for measuring the pressure in the first partial work zone, then the first pressure measuring unit advantageously forms part of a first pressure sensor system. The first pressure signals are ideally electric pressure signals. The first pressure signals are transmitted to the regulating device.

If a second pressure measuring unit is provided for measuring the pressure in the second partial work zone, then the second pressure measuring unit ideally forms part of a second pressure monitoring unit. Ideally, the second pressure signals are electric pressure signals. The second pressure signals are transmitted to the regulating device.

The embodiment in which the regulating device detects a gap width zero point of the gap between the glue application roller and the first corrugating roller as a result of a pressure change in the first and/or second partial work zone ensures a particularly simple and fail-safe regulation of a gap width zero point of the gap between the first corrugating roller and the glue application roller. Detecting the gap width zero point ensures an extremely precise and fail-safe regulation of the gap width between the glue application roller and the first corrugating roller. The gap width zero point of the gap between the first corrugating roller and the glue application roller can thus be regulated by an actual reaction force between the first corrugating roller and the glue application roller. Mechanical (counter)-stops on the glue application roller are thus unnecessary.

Correspondingly, the same applies to the embodiment in which the displacement device displaces the glue application roller such as to correspond to a gap width of the gap to be adjusted between the glue application roller and the first corrugating roller after registering the gap width zero point.

The distance measuring system which is in signal connection with the regulating device in order to dimensionally determine the gap width of the gap between the first corrugating roller and the glue application roller preferably operates by magnetostriction, in other words according to the principles of magnetostriction. The distance measuring system then comprises an elongate measuring element, preferably a measuring wire, a measuring tube or a measuring rod, and at least one position magnet, in particular at least one permanent position magnet, which are movable relative to each other. Furthermore, the distance measuring system has a converter which converts mechanical vibration into an electric signal. The elongate measuring element is used as a waveguide and is made of a magnetostrictive material such as nickel, iron and/or cobalt.

A current pulse may be induced into the elongate measuring element so as to trigger a measuring process and to generate a circular magnetic field. In the region of the at least one position magnet, the magnetic fields overlap, causing a mechanical wave to be generated in the elongate measuring element. The mechanical wave that propagates to an end of the elongate measuring element is preferably damped while the wave that propagates to the converter generates an electric signal by reversing the magnetostrictive effect. Since the velocity of the mechanical wave in the elongate measuring element is known and the time between emitting the current pulse and receiving the magnetostrictive echo is measured, this allows one to determine the relative distance travelled between the elongate measuring element and the at least one position magnet by means of the equation distance=velocity×time.

The at least one position magnet is mounted to the machine frame or to the glue application device while the elongate measuring element is mounted to the part the at least one position magnet is not mounted to.

Alternatively, it is conceivable to use potentiometric, inductive, magnetoresistive or optical distance measuring systems.

If the displacement device comprises a fluid cylinder such as a hydraulic or a pneumatic cylinder, the at least one position magnet of the distance measuring system is preferably secured to a piston which is guided for displacement in the fluid cylinder while the elongate measuring element is preferably secured to the bottom of the fluid cylinder, for instance by means of a screw connection, and protrudes into the piston rod connected to the piston. To this end, the piston rod is conveniently hollow or is provided with a corresponding receiving hole.

The distance measuring system is active, in other words arranged, between the first corrugating roller and the glue application roller. Preferably, distance measuring signals which are representative of the gap width between the glue application roller and the first corrugating roller are transmitted to the regulating unit. These signals are preferably electric signals.

When the gap width of the gap between the first corrugating roller and the glue application roller is adjusted, the glue application roller is clamped, in other words secured, relative to a machine frame of the device by means of at least one clamping device which is preferably formed by a clamping piston cylinder unit so as to ensure that there is substantially zero backlash in the joints or bearings of the displacement device and in a guide device for guiding the glue application roller, respectively. The clamping piston cylinder unit is preferably operated hydraulically, pneumatically, electrically or mechanically, for instance by means of a spring force.

The embodiment in which the regulating device detects a contact force zero point of the contact force exerted on the first corrugating roller by the glue application roller as a result of a pressure change also ensures an extremely simple and fail-safe detection of the contact force zero point of the contact force of the glue application roller when acting on the first corrugating roller, which in turn guarantees a particularly precise regulation. To this end, it is advantageous if the regulating device detects a pressure change in the first and/or second partial work zone.

It is advantageous if the glue application device further comprises a glue tray to receive glue to be applied to the tips of the corrugation of the corrugated web, the glue application roller being mounted in the glue tray. It is advantageous if the glue application device further has a glue metering roller which forms an adjustable gap together with the glue application roller so as to ensure formation of an even layer of glue on the glue application roller. The glue tray can advantageously be displaced with the glue application roller arranged therein in relation to the first corrugating roller.

This embodiment ensures a particularly simple and fail-safe displacement of the glue application roller. It is advantageous if the glue tray is guided for displacement. To this end, the glue tray and/or the machine frame of the device are/is provided with rollers.

Ideally, the glue application device is not clamped relative to the machine frame of the device when the contact force is being adjusted.

The glue application device is preferably accommodated in a protective casing when the latter works under excess pressure. Arranging the glue application device in a protective casing is a particularly easy way of reducing or eliminating external influences such as reactive forces of seals. As a result, these generally undesirable external influences have no effect on the regulating process or the glue application roller. In particular, this applies only if the glue application device is operated under a pressure above atmospheric, thus allowing the protective casing to form a pressure chamber. If the glue application device is operated under a vacuum, the protective casing is preferably omitted. In this case, the glue application device is however not exposed to any external forces either which might interfere with the regulating process.

The embodiment in which the gap regulating unit and/or the contact force regulating unit performs regulating processes in an automated manner during production of the web of corrugated cardboard which is laminated on at least one side allows the glue application roller to be adjusted or displaced relative to the first corrugating roller in a fully automatic or automated manner. As a result, the device is particularly flexible and quickly adaptable to changing process parameters and/or external influences. Furthermore, this ensures an extremely high and consistent quality when applying glue to the corrugated web in order to produce the corrugated cardboard web.

Both the gap regulating unit and the contact force regulating unit are preferably active or in use during the production of the corrugated cardboard web laminated on at least one side. Corresponding signals are thus generated. During the production of the corrugated cardboard web laminated on at least one side, it is thus possible to realise an, in particular, stepless transition between the contact pressure force regulation and the gap regulation.

This transition preferably takes place depending on process parameters, such as production speed of the at least one corrugated cardboard web laminated on one side, glue properties of the glue and/or corrugated cardboard web properties, such as corrugation height, quality thereof or the like.

By measuring hydrodynamic forces between the first corrugating roller and the glue application roller over the applied glue by the contact pressure regulating unit and regulating/actuating the gap regulating unit by means of this value, in particular disruptive influences, in particular environmental influences, such as a thermal deformation of the structural units/components and/or oscillations of the structural units/components and/or a changing paper thickness, can be eliminated.

When the contact pressure regulating unit is active, the determined gap width of the gap between the first corrugating roller and the glue application roller is preferably used as the monitoring reference. Thus, it is possible to evaluate and compensate influences impairing the contact pressure force regulation, such as soiling and/or mechanical sluggishness.

According to a preferred embodiment, it is advantageous if regulation is carried out either by means of the gap regulating unit or by means of the contact force regulating unit, depending on the respective flutes and the height as well as the type of corrugation formed in the web of corrugated cardboard to be produced. Regulation is preferably carried out using the gap regulating unit when producing webs of corrugated cardboard having large-size flutes such as A, D or K flutes while regulation is carried out using the contact force regulating unit when producing webs of corrugated cardboard having fine flutes such as C, B, E or F flutes. The other regulating unit is then inactive.

A preferred embodiment of the invention will hereinafter be described by way of example with zero to the attached drawing.

DESCRIPTION OF THE PREFERRED EMBODIMENT

A corrugated cardboard installation, which is not shown in its entirety, comprises a device 1 for producing a single-face laminated endless web 2 of corrugated cardboard.

A first splice device (not shown) and a second splice device (not shown) are arranged upstream of the device 1 for producing a single-face laminated endless web 2 of corrugated cardboard. In order to unwind a non-endless first material web from a first material web roll, the first splice device comprises a first unwinding unit and a second unwinding unit in order to unwind a non-endless second material web from a second material web roll. The non-endless first and second material webs are joined together by means of a joining and cutting unit (not shown) of the first splice device in order to provide an endless first material web 3. Each time a non-endless first material web is joined to a non-endless second material web, a first joint is produced in the endless first material web 3.

The second splice device corresponds to the first splice device. Said second splice device has a third unwinding unit in order to unwind a non-endless third material web from a third material web roll, and a fourth unwinding unit in order to unwind a non-endless fourth material web from a fourth material web roll. The non-endless third and fourth material webs are joined together by means of a joining and cutting unit (not shown) of the second splice device in order to produce an endless second material web 4.

Each time a third material web is joined to a fourth material web, a second joint is produced in the endless second material web 4.

The endless first material web 3 and the endless second material web 4 are supplied to the device 1 for producing the single-face laminated endless web 2 of corrugated cardboard separately from each other via deflection rollers (not shown).

In order to produce from the endless first material web 3 an endless corrugated web 5 that is provided with a corrugation, the device 1 for producing the single-face laminated endless web 2 of corrugated cardboard comprises a first corrugating roller 7 which is mounted for rotation about a first axis of rotation 6, and a second corrugating roller 9 which is mounted for rotation about a second axis of rotation 8. The axes of rotation 6, 8 are parallel to each other and perpendicular to a transport direction of the endless first material web 3. The corrugating rollers 7, 9 together form a roller gap 10 allowing the endless first material web 3 to be passed through in order to be provided with a corrugation. The corrugating rollers 7, 9 together form a corrugating device.

The corrugating rollers 7, 9 are mounted for rotation in side parts 11 or 12, respectively, of a stationary machine frame 13 of the device 1 via bearings 14 or 15, respectively. The side parts 11, 12 are parallel and spaced from each other. They extend vertically.

In order to join the corrugated web 5 to the endless second material 4 so as to form the single-face laminated web 2 of corrugated cardboard, the device 1 for producing the single-face laminated web 2 of corrugated cardboard has a glue application roller 16 arranged downstream of the corrugating rollers 7, 9 which glue application roller 16 in turn comprises a glue tray 17, a glue metering roller 18 arranged in the glue tray 17 as well as a glue application roller 19 arranged in the glue tray 17. The glue application roller 19 is arranged between the glue metering roller 18 and the first corrugating roller 7. The glue metering roller 18 and the glue application roller 19 are mounted for rotation in side walls 22 or 23, respectively, of the glue tray 17. The glue application device 16 comprising the glue metering roller 18 and the glue application roller 19 is displaceable perpendicularly to the first corrugating roller 7.

The glue metering roller 18 is mounted for rotation about a third axis of rotation 20 while the glue application roller 19 is mounted for rotation about a fourth axis of rotation 21. The axes of rotation 20, 21 are parallel to each other. They are also parallel to the axes of rotation 6, 8 of the corrugating rollers 7 or 9, respectively.

The glue application roller 19 and the first corrugating roller 7 together form a gap 24 allowing the corrugated web 5 to be passed through in order to be provided with a glue layer, with the gap 24 thus forming a gluing gap. Glue (not shown), which is provided in the glue tray 17, is then applied to free tips of the corrugation of the corrugated web 5 transported in the transport direction via the glue application roller 19 which is immersed in said gluing gap and rotates about the fourth axis of rotation 21. The glue metering roller 18 is arranged substantially opposite to the first corrugating roller 17 and adjacent to the glue application roller 19, thus ensuring that an even glue layer is formed on the glue application roller 19. Said glue application roller 19 then rotates about its fourth axis of rotation 21.

The glue application roller 19 and the glue metering roller 18 are drivable for rotation by means of a drive belt 50 which is in turn drivable in a peripheral direction by means of a drive 51. In other words, the rollers 18, 19 are driven for rotation during operation.

In the device 1 for producing the single-face laminated endless web 2 of corrugated cardboard, the corrugated web 5 provided with glue is then joined to an endless second material web 4 transported in the transport direction in order to obtain the endless web 2 of corrugated cardboard.

The endless second material web 4 is pressed against the corrugated web 5 provided with glue, which partly abuts against the first corrugating roller 7, by means of a pressure belt module 25 of the device 1 for producing the single-face laminated endless web 2 of corrugated cardboard. Relative to the corrugated web 5, the pressure belt module 25 is arranged downstream of the glue application device 16 and the roller gap 10. The pressure belt module 25 is arranged above the first corrugating roller 7. The pressure belt module 25 has a deflection roller 27 which is mounted for rotation about a fifth axis of rotation 26, and a deflection roller 29 which is mounted for rotation about a sixth axis of rotation 28 as well as an endless pressure belt 30 which is guided around the deflection rollers 27, 29 in a peripheral direction. The axes of rotation 26, 28 are parallel to each other. They are also parallel to the axes of rotation 6, 8.

Figure 1:
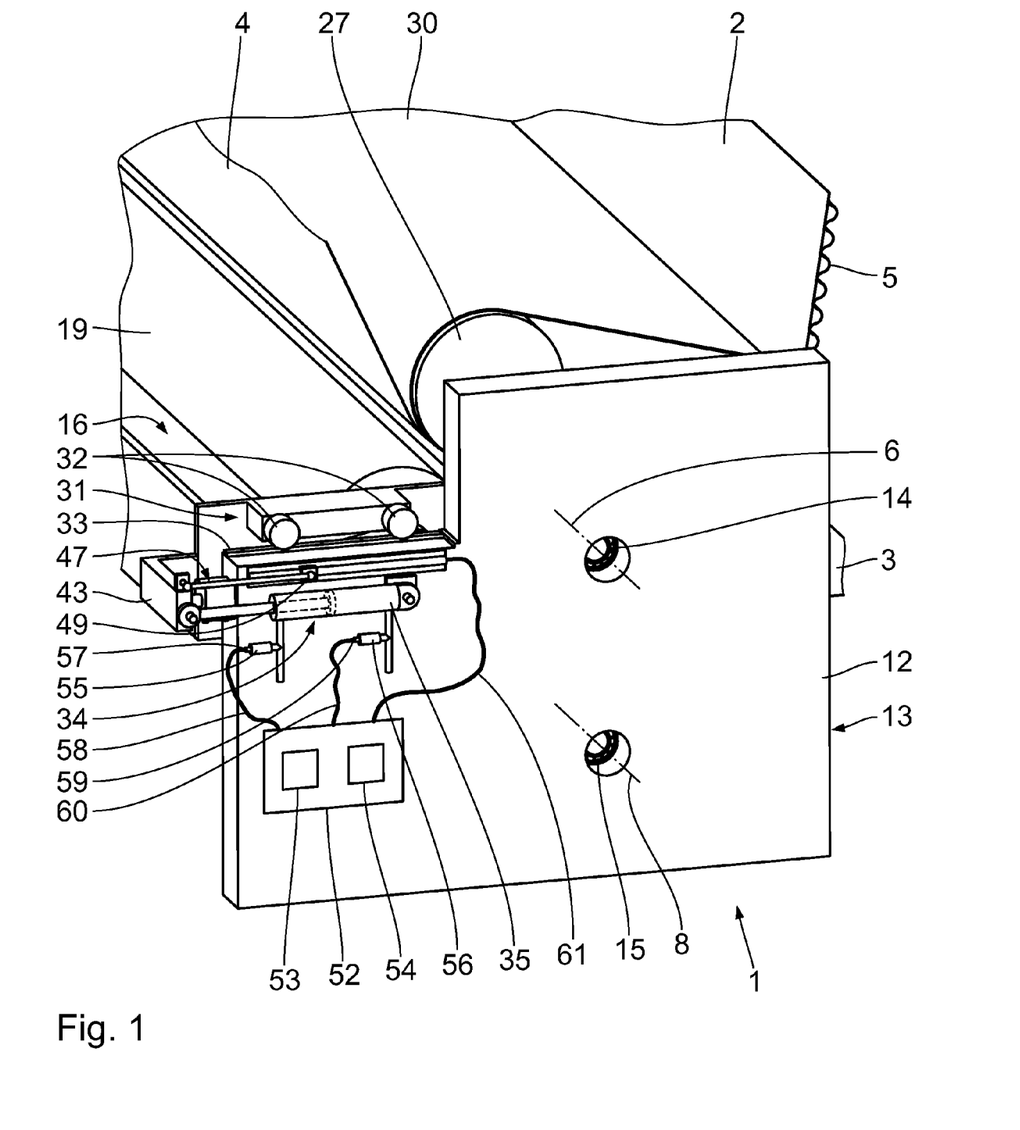
FIG. 1 shows a perspective view of a device according to the invention for producing a single-face laminated endless web of corrugated cardboard.
Figure 2:
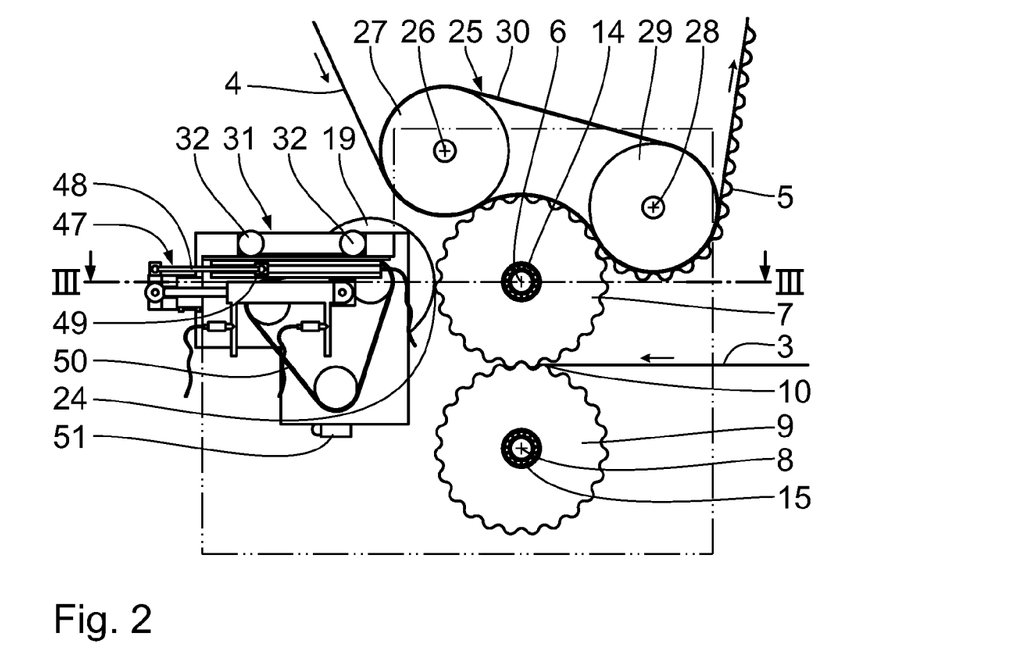
FIG. 2 shows a schematic side view of the device shown in FIG. 1.
Figure 3:
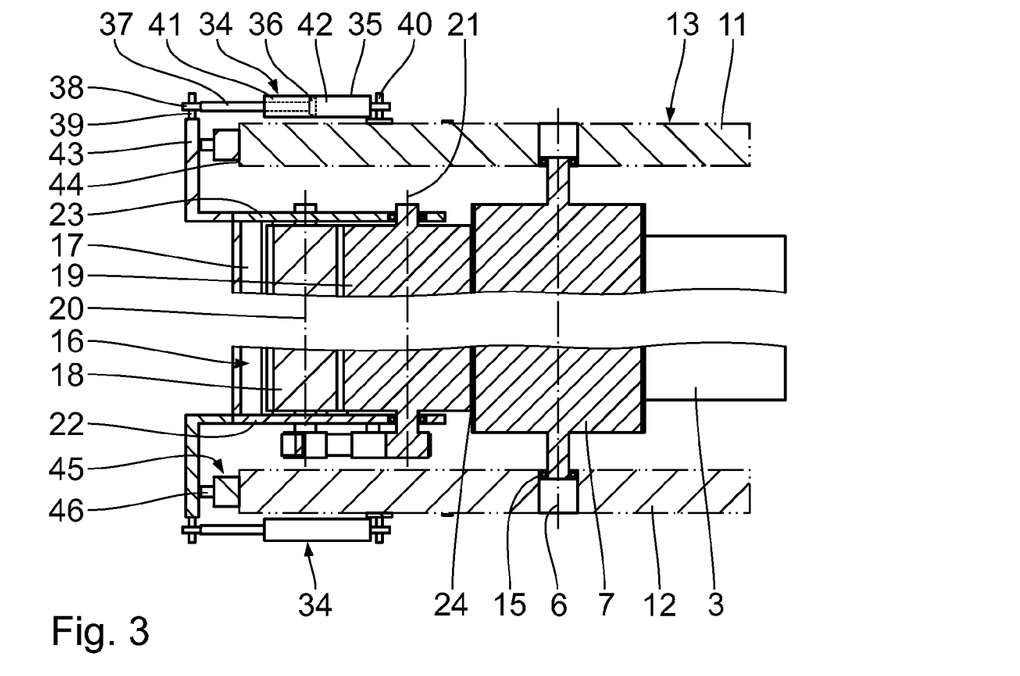
FIG. 3 shows a sectional view through the device shown in FIG. 2 along section line III-III in FIG. 2.
Figure 4:
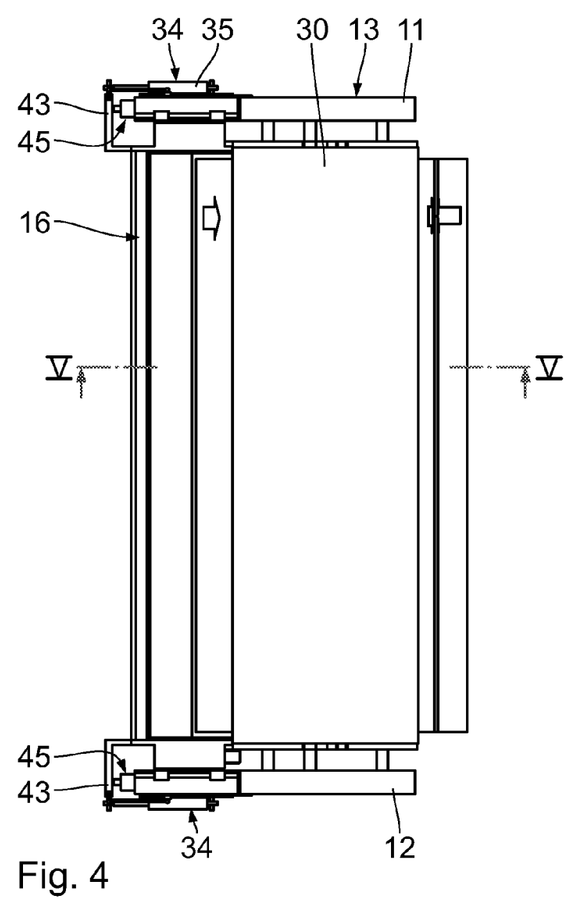
FIG. 4 shows a plan view of the devices shown in FIGS. 1 to 3.
Figure 5:
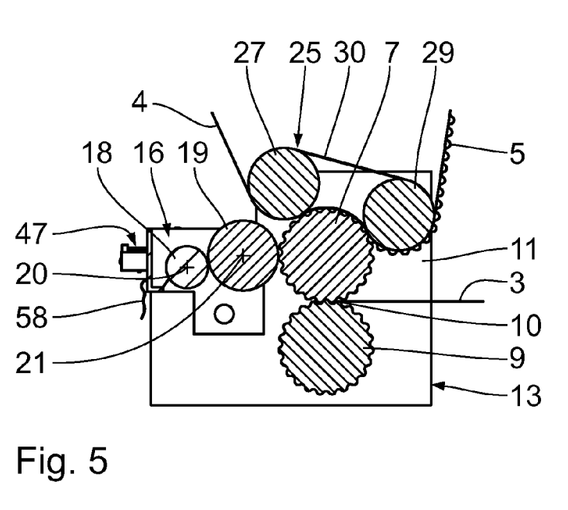
FIG. 5 shows a sectional view through the device shown in FIG. 4 along section line V-V in FIG. 4.

The first corrugating roller 7 partly engages a space between the deflection rollers 27, 29, causing the pressure belt 30 to be deflected by the first corrugating roller 7. The pressure belt 30 is pressed against the endless second material web 4, thus causing the second material web 4 to be pressed against the corrugated web 5 provided with glue which abuts against the first corrugating roller 7. The web 2 of corrugated cardboard has a particular corrugation height, in other words particular flutes (see FIG. 1).

The installation for producing a web of corrugated cardboard may comprise another device 1 for producing a single-face laminated endless web 2 of corrugated cardboard which is then glue to the other web 2 of corrugated cardboard.

The longitudinal edges of the web 2 of corrugated cardboard may then be cut off using a longitudinal cutting device. It is conceivable for the web 2 of corrugated cardboard to be cut into individual sheets of corrugated cardboard in a direction perpendicular to its transport direction using a cross-cutting device.

The following is a more detailed description of a preferred embodiment of the glue application device 16 and the regulation or displacement thereof. As already mentioned above, the glue application device 16 is adjustable or displaceable relative to the first corrugating roller 7. To this end, each side wall 22, 23 of the glue application device 16 is provided with in each case one roller unit 31 which roller units 31 are opposite to each other and are provided with rollers 32. The rollers 32 of one roller unit 31 are arranged in a horizontal plane in such a way as to be laterally offset from each other. They are in each case supported by a track 33 which extends horizontally and is formed or arranged at the machine frame 13. The tracks 33 extend perpendicularly and horizontally to the first axis of rotation 6.

Furthermore, two piston cylinder units 34 are provided which are in each case active between the machine frame 13 and the glue application device 16. The piston cylinder units 34 are configured identically and are arranged at the outer sides in such a way as to be opposite to each other. They extend substantially horizontally. Each piston cylinder unit 34 comprises a cylindrical casing 35 in which a piston 36 is guided for axial displacement in such a way as to be sealed relative to the casing 35. The piston 36 is in each case adjoined by a piston rod 37 which protrudes out of the casing 35. A free outer end 38 of the piston rod 37 is provided with a first fastening means 39 while a second fastening means 40 is arranged at the casing 35 in a position opposite to the end of the casing 35 which is penetrated by the piston rod 37. Each piston cylinder unit 34 is secured to the respective side part 11, 12 of the machine frame 13 via its respective second fastening means 40. Furthermore, each piston cylinder unit 34 is secured to the glue application device 16 via its respective first fastening means 39. A reverse arrangement is conceivable as well.

The casing 35 defines a work zone for each piston cylinder unit 34, which work zone is filled with a fluid. The pistons 36 divide the work zone into a respective first partial work zone 41 and a respective second work zone 42. They are in each case movable relative to the casing 35.

The first fastening means 39 are secured to transmission protrusions 43 which are rigidly connected to the side walls 22, 23 in such a way as to for instance protrude therefrom in the direction of the outer sides.

The side parts 11 and 12 are further provided with a respective side surface 44 facing the transmission protrusions 43, wherein a clamping piston cylinder unit 45 is provided between each side surface 44 and the transmission protrusion 43 arranged adjacent thereto.

Each clamping piston cylinder unit 45 has a retractable and extendable clamping body 46 which is supported against the inner side of the respective transmission protrusion 43. The casing of the respective clamping piston cylinder unit 45 on the other hand is secured to the machine frame 13. A reverse arrangement is conceivable as well.

The clamping piston cylinder units 45 and the piston cylinder units 34 have lines of action which are parallel to each other and extend preferably horizontally.

Furthermore, two laterally outer distance measuring systems 47 are arranged between the machine frame 13 and the glue application device 16. Each distance measuring system 47 operates according to the principles of magnetostriction and comprises a measuring rod 48 secured to the transmission protrusion 43 which passes by or passes through the permanent magnet 49 secured to the machine frame 13. A reverse arrangement is conceivable as well. The measuring rods 48 extend horizontally and parallel to each other. When the glue application device 16 is displaced relative to the first corrugating roller 7, a relative movement takes place between the measuring rods 48 and the permanent magnets 49 associated thereto which is detected by means of a distance measurement.

The device 1 for producing the single-face laminated endless web 2 of corrugated cardboard further has a regulating device 52 comprising a gap regulating unit 53 and a contact force regulating unit 54.

A first pressure sensor unit 55 is connected to the first partial work zone 41 in a pressure-transmitting manner while a second pressure sensor unit 56 is connected to the second partial work zone 42 in a pressure-transmitting manner. The first pressure sensor unit 55 has a first output 57 which is in electric signal connection with the regulating device 52 via a first connection line 48. The second pressure sensor unit 55 has a second output 57 which is in electric signal connection with the regulating device 52 via a second connection line 48. Furthermore, each distance measuring system 47 is electrically connected to the regulating device 52 via a respective connection line 61.

During operation, the regulating device 52 receives first pressure signals from the first pressure sensor unit 55 which are in each case representative of the pressure in the first partial work zone 41. The regulating device 52 receives second pressure signals from the second pressure sensor unit 56 which are in each case representative of the pressure in the second partial work zone 42. The regulating device 52 receives distance measuring signals from the distance measuring systems 47 which are in each case representative of the gap width between the first corrugating roller 7 and the glue application roller 19. The signals are then processed to allow regulation in the regulating device 52 to be carried out on the basis of these signals.

Corresponding to the setting of the regulating device 16, the glue application device 16 is displaceable relative to the machine frame 13 or relative to the first corrugating roller 17 by retracting or extending the piston rods 37. When the glue application device 16 is displaced, the roller units 31 correspondingly move along the tracks 33.

When the gap is adjusted by means of the gap regulating unit 33, the glue application device 16 is clamped, by means of the clamping piston cylinder units 45, relative to the machine frame 13 by extending the clamping bodies 46. The contact between the glue application roller 19 and the first corrugating roller 7 is detected by the regulating device 52 as a result of a pressure increase in the first and/or second partial receiving space 41 or 42, respectively. In other words, this pressure increase serves as a zero point for gap regulation by means of the gap regulating device 53. When said zero point has been registered by the regulating device 52, the glue application device 16 is displaced by means of the piston cylinder unit 34 to a position that is spaced from the first corrugating roller 7 by the desired amount.

When the device 1 for producing the single-face laminated web 2 of corrugated cardboard is operated with a preset gap 24 between the first corrugating roller 7 and the glue application roller 19, a residual force is mesurable by the pressure sensor units 55, 56. This residual force is due to the corrugation tips of the corrugated web 5 which are immersed in the glue layer, in other words in the glue coating, on the glue application roller 19, and/or to the resilience of the corrugated web 5 which causes the corrugated web 5 to spring away from the glue application roller 19. The vibrations of this residual force detected are evaluated in the regulating device 52 in order for the gap 24 between the first corrugating roller 7 and the glue application roller 19 to be maintained, and are taken into account for regulation.

When the contact force is adjusted by means of the contact force regulating unit 54, the clamping piston cylinder units 45 are deactivated so as to be inoperable. The contact between the glue application roller 19 and the first corrugating roller 7 is again detected by means of the regulating device 52 as a result of a pressure increase in the first and/or second partial work zone 41 or 42, respectively, and serves as a zero point. Based on this zero point, the contact force of the glue application roller 19 abutting against the first corrugating roller 7 is adjusted as required. This prevents the glue application roller 19 from being damaged when moved towards the first corrugating roller 7.

When the device 1 for producing the single-face laminated endless web 2 of corrugated cardboard is in operation, an automated gap regulation is performed continuously by the gap regulating unit 53, and an automated contact force regulation is performed continuously by the contact force regulating unit 54.

When the device 1 for producing the single-face laminated endless web 2 of corrugated cardboard is in operation, it is either possible to perform a gap regulation by means of the gap regulating unit 53 or a contact force regulation by means of the contact force regulating unit 54.

As a general rule, contact force regulation by means of the contact force regulating unit 54 may be performed for all flute sizes, in other words corrugation heights, of the web 2 of corrugated cardboard to be produced. Negative effects may however occur when the web 2 of corrugated cardboard is provided with a corrugation having a particularly large size since the large-size corrugation of the first corrugating roller 7 will cause the glue application device 16, strictly speaking the glue application roller 19, to be exposed to strong vibrations which may greatly reduce the service life of the glue application roller 19.

It is therefore advantageous to perform a contact force regulation by means of the contact force regulating unit 54 when producing webs 2 of corrugated cardboard having fine flutes or corrugations. As a general rule, it is important to provide particularly thin and precisely arranged glue layers, in other words glue coatings. These very thin and precisely arranged glue layers are difficult to produce when regulating the gap using the gap regulating unit 53 since these fine flutes generate only minor vibrations in the glue application device 16 and the glue application roller. Examples of typical fine flutes are C, B, E and F flutes.

For large-size flutes, in other words corrugations, on the other hand which are generally produced such as to have thicker glue layers, it is more advantageous to perform gap regulation using the gap regulating device 53. Examples of large-size flutes of this type are A, D or K flutes. Transmission of the vibrations to the glue application device 16 and the glue application roller is thus avoided.

Consequently, a regulation of the device according to the invention for producing an at least single-face laminated endless web 2 of corrugated cardboard is preferably performed depending on the flutes or types of corrugation in the web 2 of corrugated cardboard to be produced.

What is claimed is:

1. A method of producing an endless web of corrugated cardboard which is laminated on at least one side, the method comprising the following steps:
    producing a corrugated web having a corrugation by means of a first corrugating roller and a second corrugating roller;
    applying glue to tips of the corrugation of the corrugated web by means of a glue application roller of a glue application device, wherein the glue application roller
        is associated to the first corrugating roller in such a way as to form a gap; and
        is displaceable relative to the first corrugating roller in order to influence the glue application quantity to be applied to the tips of the corrugation of the corrugated web;
    providing a displacement device in order to displace the glue application roller relative to the first corrugating roller;
    pressing a laminating web against the tips provided with glue of the corrugated web by means of a pressing device, wherein the corrugated web abuts against the first corrugating roller in a pressing region; and
    performing an regulating using a regulating device which
        is in signal connection with the displacement device for actuation thereof;
        comprises a gap regulating unit in order to adjust a gap width of the gap between the first corrugating roller and the glue application roller; and
        comprises a contact force regulating unit in order to adjust a contact force applied to the first corrugating roller by the glue application roller.

2. A device for producing an endless web of corrugated cardboard which is laminated on at least one side, the device comprising
    a) a first corrugating roller and a second corrugating roller for producing a corrugated web that is provided with a corrugation;
    b) a glue application device which comprises
        i) a glue application roller for applying glue to the tips of the corrugation of the corrugated web, wherein the glue application roller
            is associated to the first corrugating roller so as to form a gap; and
            has a distance from the first corrugating roller that is changeable in order to influence the glue application quantity applied to the tips of the corrugation of the corrugated web;
    c) a displacement device for displacing the glue application roller relative to the first corrugating roller;
    d) a pressing device for pressing a laminating web against the tips, provided with glue, of the corrugated web which abuts against the first corrugating roller in a pressing region; and
    e) a control device which
        i) is in signal connection with the displacement device for actuation thereof;
        ii) comprises a gap regulating unit for regulating a gap width of the gap between the first corrugating roller and the glue application roller; and
        iii) a contact force regulating unit for regulating a contact force applied to the first corrugating roller by the glue application roller.

3. A device according to claim 2, wherein the displacement device comprises at least one length-adjustable piston cylinder unit for displacing the glue application roller relative to the first corrugating roller.

4. A device according to claim 3, wherein the at least one piston cylinder unit comprises a first partial work zone, a second partial work zone, and a displaceable piston which separates the first and second partial work zones from each other as well as a piston rod which is connected to the piston.

5. A device according to claim 4, wherein a first pressure measuring unit measures the pressure in the first partial work zone, and the regulating device receives first pressure signals which are representative of the pressure measured in the first partial work zone.

6. A device according to claim 4, wherein a second pressure measuring unit measures the pressure in the second partial work zone, and the regulating device receives second pressure signals which are representative of the pressure measured in the second partial work zone.

7. A device according to claim 4, wherein the regulating device detects a gap width zero point of the gap between the glue application roller and the first corrugating roller as a result of a pressure change in at least one of the first and second partial work zone.

8. A device according to claim 7, wherein after registering the gap width zero point, the displacement device displaces the glue application roller such as to correspond to a gap width of the gap to be adjusted between the glue application roller and the first corrugating roller.

9. A device according to claim 2, comprising at least one distance measuring system which is in signal connection with the regulating device in order to dimensionally determine the gap width of the gap between the first corrugating roller and the glue application roller.

10. A device according to claim 1, wherein when regulating the gap width of the gap between the glue application roller and the first corrugating roller, the glue application device is clamped relative to a machine frame of the device by means of at least one clamping unit which is preferably formed by a clamping piston cylinder unit.

11. A device according to claim 2, wherein the regulating device detects a contact force zero point of the contact force exerted on the first corrugating roller by the glue application roller as a result of a pressure change.

12. A device according to claim 2, wherein at least one of the gap regulating unit and the contact force regulating unit performs regulating processes in an automated manner during production of the web of corrugated cardboard which is laminated on at least one side.

13. Device according to claim 2, wherein an automated gap regulation by the gap regulating unit and a contact force regulation by the contact force regulating unit take place continuously during the production of the web of corrugated cardboard laminated on at least one side.

14. Device according to claim 2, wherein one of the group comprising the gap regulation by the gap regulating unit and the contact force regulation by the contact force regulating unit are used depending on at least one of process parameters, glue properties and properties of the web of corrugated cardboard.

15. Device according to claim 2, wherein during the contact force regulation by the contact force regulating unit, a gap width of the gap determined by the gap regulating unit is used as the monitoring reference.

16. A device according to claim 2, wherein depending on the flutes of the web of corrugated cardboard to be produced, one of the group comprising the gap regulating unit and the contact force regulating unit is active, wherein the gap regulating unit is preferably active when producing webs of corrugated cardboard having large-size flutes while the contact force regulating unit is preferably active when producing webs of corrugated cardboard having fine flutes.

* * * * *